United States Patent
Peters

[11] Patent Number: 6,022,224
[45] Date of Patent: Feb. 8, 2000

[54] SHOCK MOUNT CONNECTOR FOR HEAD DISK ASSEMBLY

[75] Inventor: David Eric Peters, San Jose, Calif.

[73] Assignee: International Business Machines Corporation, Armonk, N.Y.

[21] Appl. No.: 09/120,950

[22] Filed: Jul. 22, 1998

[51] Int. Cl.[7] .................................................. H01R 9/09
[52] U.S. Cl. ......................................................... 439/66
[58] Field of Search ............................... 439/66, 591, 91; 361/685

[56] References Cited

U.S. PATENT DOCUMENTS

| | | | |
|---|---|---|---|
| 4,664,458 | 5/1987 | Worth | 439/66 |
| 4,937,806 | 6/1990 | Babson et al. | 369/75.1 |
| 4,979,062 | 12/1990 | Stefansky | 360/97.02 |
| 5,199,889 | 4/1993 | McDevitt, Jr. | 439/66 |
| 5,340,340 | 8/1994 | Hastings et al. | 439/64 |
| 5,344,332 | 9/1994 | Lopez et al. | 439/248 |
| 5,366,200 | 11/1994 | Scura | 248/632 |
| 5,402,308 | 3/1995 | Koyanagi et al. | 361/685 |
| 5,422,767 | 6/1995 | Hatchett et al. | 360/98.01 |
| 5,427,535 | 6/1995 | Sinclair | 439/66 |
| 5,437,556 | 8/1995 | Bargain et al. | 439/66 |
| 5,491,892 | 2/1996 | Fritz et al. | 439/384 |
| 5,602,717 | 2/1997 | Leshem et al. | 361/685 |
| 5,673,171 | 9/1997 | Varghese et al. | 361/685 |

OTHER PUBLICATIONS

IBM Technical Disclosure Bulletin, vol. 32 No. 10B; Mar. 1990; "Pluggable Hard Disk File Assembly".
IBM Technical Disclosure Bulletin, vol. 34 No. 7B; Dec. 1991; "Fine Pitch Parallel Board Connector".

*Primary Examiner*—Michael L. Gellner
*Assistant Examiner*—Briggitte R. Hammond
*Attorney, Agent, or Firm*—Noreen A. Krall; Michael E. Noe; Andrew J. Dillon

[57] ABSTRACT

A hard disk drive connector with elastomeric shock mounts reduces the amount of mechanical vibration or shock which can travel to or from the head disk drive. The shock mounts are placed between the system components and the mechanical fasteners of the connector to mechanically isolate the connector. The shock mounts attach to the head disk assembly where they work through compression beams to the card electronics. This configuration isolates the head disk assembly from shock coming from the system through the card electronics. It also isolates vibration emitted from the head disk assembly to the system.

19 Claims, 2 Drawing Sheets

SHOCK MOUNT CONNECTOR FOR HEAD DISK ASSEMBLY

TECHNICAL FIELD

This invention relates in general to electrical connectors and in particular to a shock and vibration absorbing electrical connector for a head disk assembly.

BACKGROUND ART

As hard disk drive capacities and data rates have increased, a need has arisen to maintain mechanical isolation between the card electronics and the head disk assembly (HDA). Areal density has increased by storing data in tracks closer together on the recording disk. The areal density of disk drives has reached a point that vibration within the disk drive and from adjacent disk drives within a large system can have effects on neighboring disk drives in large systems. With hard disk drives operating in the range of 10K rpm, large banks of drives operating simultaneously may cause excessive vibration. Other sources of vibration and mechanical shock may include hot plugging operations or system maintenance. Hot plugging occurs when disk drives are inserted or removed while the system is operating. Vibration and mechanical shock from these sources is known to force the recording heads out of their appropriate tracks with the high areal density.

Mechanical isolation would reduce the amount of vibration or mechanical shock to the servo control system. Currently, any shock or vibration experienced in the system travels directly through system backplanes into the interface connector and back into the HDA. There are several prior art connector designs which are readily available to the industry. In each case, however, one end or both ends of the connectors are hard mounted to at least one piece of the system. The hard mounting could be a solder joint, rivets, screws or other fastening devices. Hard mounted fasteners set up a direct path between the operating and vibrating HDA to the electronics and out to the backplane. When shock or vibration is allowed to propagate through this path, the total system performance is diminished.

DISCLOSURE OF THE INVENTION

A connector with shock mounts reduces the amount of mechanical vibration or shock which can travel to or from the HDA. The shock mounts are placed on the arm electronics (AE) and motor connectors (two connectors with historically intimate contact between the card electronics and the HDA) between the mounting components and the mechanical fasteners. The shock mounts isolate the AE and the motor connectors from both systems. The shock mounts are formed from an elastomeric material, such as rubber gaskets, and attach to the HDA where they work through compression beams to the card electronics. This configuration isolates the HDA from shock coming from the system through the card electronics. It also isolates vibration through the AE or motor connectors, and the system storage boxes from vibration emitted from the HDA out through the AE and motor connectors and into the system.

BEST MODE FOR CARRYING OUT THE INVENTION

Figure 1:
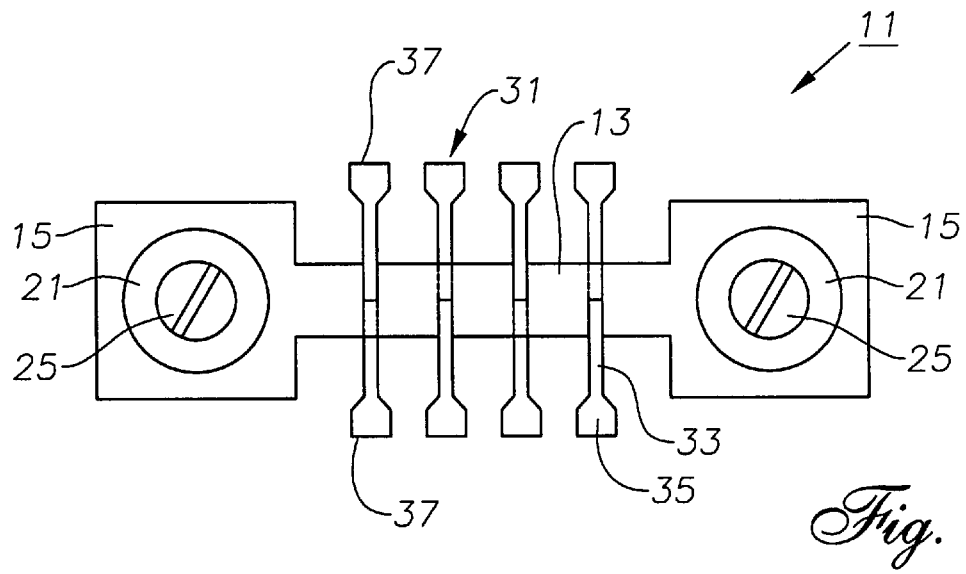
FIG. 1 is a top view of a connector constructed in accordance with the invention.
Figure 2:
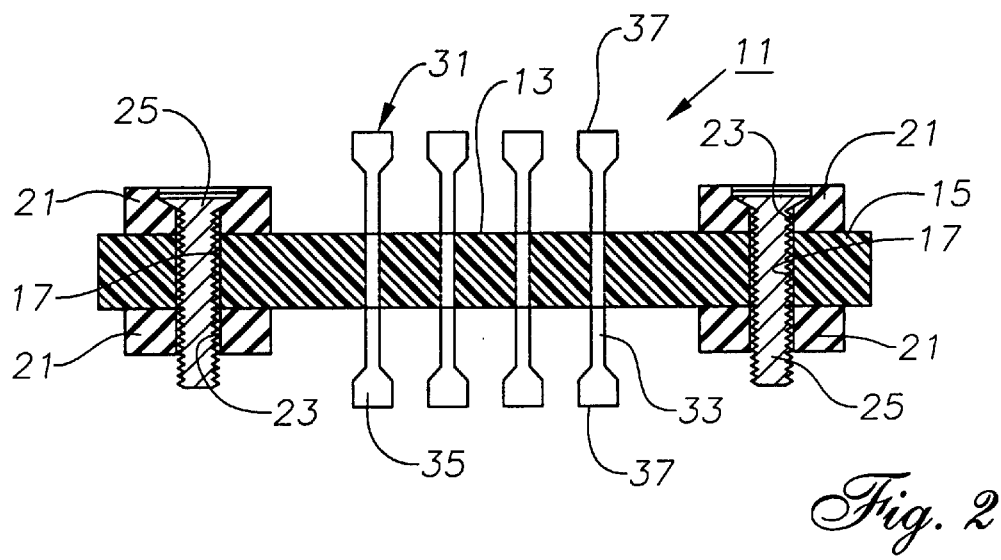
FIG. 2 is a side view of the connector of FIG. 1.
Figure 3:
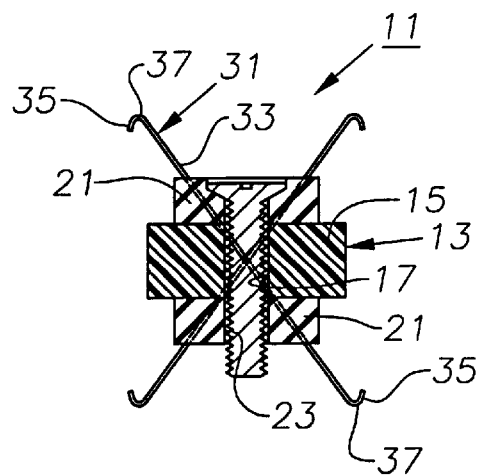
FIG. 3 is a sectional end view of the connector of FIG. 1.

Referring to FIGS. 1–3, a compression connector 11 for joining a head disk assembly to an electronics card is shown. Connector 11 has a plastic, insulative body 13 with a mounting platform 15 on either end. In the embodiment shown, body 13 is generally rectangular when viewed from the side (FIG. 2), and I-shaped when viewed from above (FIG. 1). Mounting platforms 15 are also rectangular and have a central through hole 17.

Each mounting platform 15 has an upper and lower surface to which is secured a shock mount 21. Shock mounts 21 are generally flat circular disks or gaskets that are formed from an elastomeric material such as rubber. Each shock mount has a central hole 23 which aligns one of holes 17 in mounting platforms 15. A fastener 25, such as a screw or the like, extends through set of holes 17, 23. Holes 23 are recessed so that fasteners 25 are sunken within shock mounts 21 when installed.

Connector 11 also comprises a plurality of electrical contacts 31. Each contact 31 is a generally S-shaped, flat metallic wiping member for making electrical contact with system components. Contacts 31 have a flexible, linear body portion 33 and a pair of curved end portions 35 which arc back toward body portion 33 at an angle of approximately 45 degrees. End portions 35 curve back toward body portion 33 on opposite sides to give contact 31 the S-shape. In the embodiment shown, end portions 35 are wider than body portion 33 and are tapered where they interface. Alternatively, end portions 35 may be the same width as body portions 33. As shown in FIG. 3, a convex wiping surface 37 is defined by each end portion 35.

Contacts 31 are molded in plastic body 13 in alternating directions between mounting platforms 15 such that they form a diagonal X-pattern at approximately 45 degrees each when viewed from the end (FIG. 3). Thus, the midpoints of body portions 33 are located within body 13, and adjacent bodies 13 are approximately perpendicular to one another. In this configuration, wiping surfaces 37 are located both above and below the highest and lowest extremities of the remainder of connector 11 (FIG. 2), respectively, and extend wider than the lateral edges of connector 11 (FIG. 1).

Figure 4:
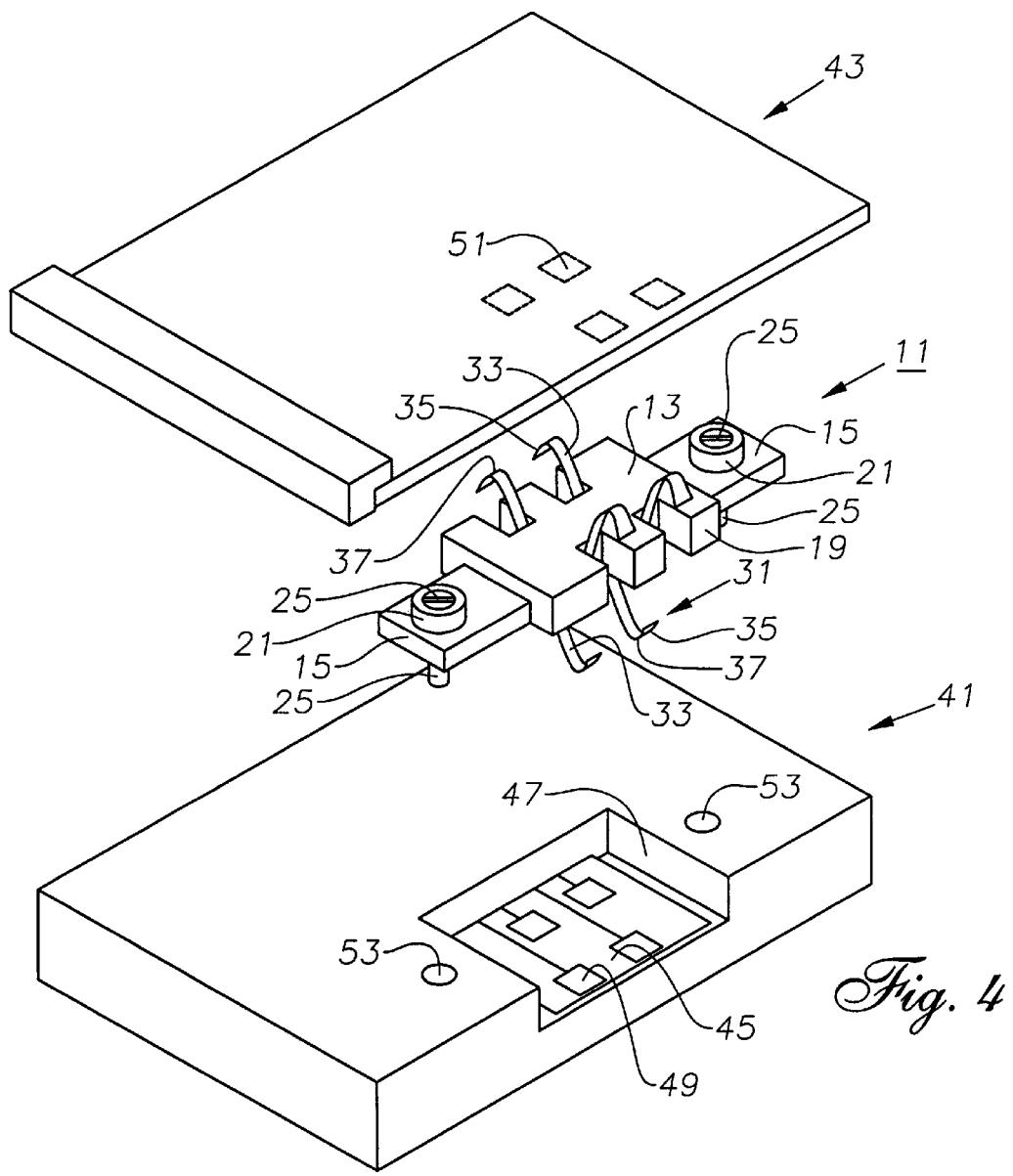
FIG. 4 is an isometric view of the connector of FIG. 1 prior to installation between a head disk assembly and an electronics card.

Alternatively (FIG. 4), body 13 may be wider than mounting platforms 15 and contain a series of square notches 19 along it sides which are perpendicular to its length. In this embodiment, body portions 33 of contacts 31 are closely received by the inner surfaces of notches 19. In yet another variation to either version of body 13 (not shown), contacts 31 may be spring-biased within slots in body 13 by a spring such that they tend to return to their diagonal orientation after being vertically compressed.

In operation (FIG. 4), connector 11 is provided for joining a pair of electrical components such as head disk assembly 41 and electronics card 43. Assembly 41 is a rectangular member with a flexible cable 45 mounted in a recess 47. Cable 45 has a plurality of upward-facing electrical pads 49 which are provided for making contact with wiping surfaces 37 on the lower ends of contacts 31. Card 43 is also rectangular and parallel to assembly 41. Card 43 has a plurality of downward-facing electrical pads 51 (indicated by dashed lines) on a lower surface which are provided for making contact with wiping surfaces 37 on the lower ends of contacts 31. Both pads 49 and 51 are staggered to register with the alternating configuration of contacts 31 in connector 11.

Figure 5:
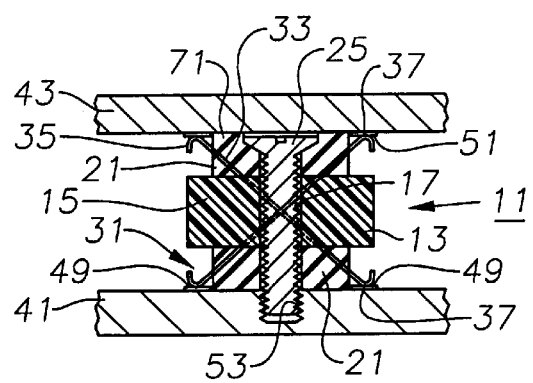
FIG. 5 is a sectional end view of the connector of FIG. 1 after installation between the head disk assembly and electronics card of FIG. 4.

Referring to FIG. 5, connector 11 is fastened to assembly 41 by inserting fasteners 25 through holes 23, 17 and securing them in holes 53 in an upper surface of assembly 41. Shock mounts 21 are held in place by fasteners 25. Only shock mounts 21 on the lower surfaces of mounting platforms 15 make contact with the upper surface of assembly 41. Card 43 is mounted in card edge slots (not shown) above assembly 41 and connector 11. Only the shock mounts 21 on the upper surfaces of mounting platforms 15 make contact with the lower surface of card 43. Fasteners 25 are sunken within recesses in shock mounts 21 and do not touch card 43. Thus, any mechanical vibration or shock experienced by the components will be absorbed by shock mounts 21 and not transferred to the other components. Contacts 31 are able to flex slightly during operation so that wiping surfaces 37 constantly remain in electrical contact with pads 49, 51.

The invention has several advantages. The connector is mechanically isolated from the components it is connecting such that shock or vibration experienced by the system does not affect the integrity of its electrical connection or the performance of the system. In addition, the shock mounts are recessed to provide electrostatic discharge protection for system components.

While the invention has been shown or described in only some of its forms, it should be apparent to those skilled in the art that it is not so limited, but is susceptible to various changes without departing from the scope of the invention.

I claim:

1. A connector for electrically connecting a first electrical component to a second electrical component, each of the electrical components having electrical contact pads, the connector comprising:
    a connector body having first and second sides which are adapted to face the first and second electrical components, respectively;
    elastomeric shock mounts on the connector body, each mount having a first end protruding from the first side to engage the first electrical connector and a second end protruding from the second side to engage the second electrical connector; and
    a plurality of resilient contacts mounted to the connector body, each of the contacts having a first end which protrudes past the first side for engaging contacts of the first electrical component, and each of the contacts having a second end which protrudes past the second side for engaging contacts of the second electrical component.

2. The connector of claim 1 wherein the connector body has lateral edges which face in opposite directions, wherein the first end of each contact is proximate to one of the lateral edges, and the second end of each contact is proximate to the other of the lateral edges.

3. The connector of claim 1 wherein the contacts are spaced apart from one another along a length of the connector body and are staggered in orientation such that they form an "X" pattern when viewed from an end of the connector body.

4. The connector of claim 1, further comprising a fastener extending through the each shock mount and the connector body, the fasteners being adapted to engage one of the electrical components.

5. The connector of claim 1 wherein the shock mounts are located on opposite ends of the connector body.

6. A connector for electrically connecting a first electrical component to a second electrical component, each of the electrical components having electrical contact pads, the connector comprising:
    a connector body having at least two mounting platforms;
    an elastomeric shock mount mounted to each of the mounting platforms for engaging one of the electrical components and absorbing vibration;
    a fastener extending through each shock mount and mounting platform, each of the fasteners being adapted to engage a mounting hole in one of the electrical components; and
    a plurality of resilient contacts mounted to the connector body, each of the contacts having a contact surface on each end for engaging one of the electrical contact pads on each of the electrical components; and wherein
    the contacts alternate directions between the mounting platforms such that they form a diagonal X-pattern when viewed from an end of the connector body.

7. The connector of claim 6, further comprising a hole in each mounting platform which is adapted to register with mounting holes provided on one of the electrical components; and wherein
    each of the shock mounts has a hole which is coaxial with the hole in each of the mounting platforms.

8. The connector of claim 6 wherein the mounting platforms are located on ends of the connector body.

9. The connector of claim 6 wherein the shock mounts are formed from an elastomeric material.

10. The connector of claim 6 wherein the shock mounts are located at opposite ends of the connector body and the contacts are located between the shock mounts.

11. The connector of claim 6 wherein the connector body has a series of notches along each of its sides which are perpendicular to its length and wherein the contacts extend through the notches.

12. The connector of claim 6 wherein the ends of the contacts are generally S-shaped, flat metallic wiping members.

13. The connector of claim 12 wherein the contacts have a flexible, linear body portion and the ends are curved and arc back toward the body portion.

14. The connector of claim 13 wherein the ends are wider than the body portions.

15. A connector for electrically connecting a first electrical component to a second electrical component, each of the electrical components having electrical contact pads, the connector comprising:
    a connector body having at least two mounting platforms;
    an elastomeric shock mount mounted to each of the mounting platforms for engaging one of the electrical components and absorbing vibration;
    a fastener extending through each shock mount and mounting platform, each of the fasteners being adapted to engage a mounting hole in one of the electrical components; and
    a plurality of resilient contacts mounted to the connector body, each of the contacts having a flexible, linear body portion and a contact surface on each end which is a generally S-shaped, flat metallic wiping member which is wider than the body portion and arcs back toward the body portion for engaging one of the electrical contact pads on each of the electrical components; and wherein
    the contacts alternate directions between the mounting platforms such that they form a diagonal X-pattern when viewed from an end of the connector body.

16. The connector of claim 15, further comprising a hole in each mounting platform which is adapted to register with mounting holes provided on one of the electrical components; and wherein each of the shock mounts has a hole which is coaxial with the hole in each of the mounting platforms.

17. The connector of claim 15 wherein the mounting platforms are located on ends of the connector body.

18. The connector of claim 15 wherein the shock mounts are located at opposite ends of the connector body and the contacts are located between the shock mounts.

19. The connector of claim 15 wherein the connector body has a series of notches along each of its sides which are perpendicular to its length and wherein the contacts extend through the notches.

* * * * *